(No Model.) 2 Sheets—Sheet 1.

C. A. JONES.
COMBINED SEEDER, FERTILIZER, AND CULTIVATOR.

No. 342,103. Patented May 18, 1886.

Witnesses.

Inventor
Charles A. Jones
By Prince & Fisher
Attys.

(No Model.) 2 Sheets—Sheet 2.
C. A. JONES.
COMBINED SEEDER, FERTILIZER, AND CULTIVATOR.
No. 342,103. Patented May 18, 1886.
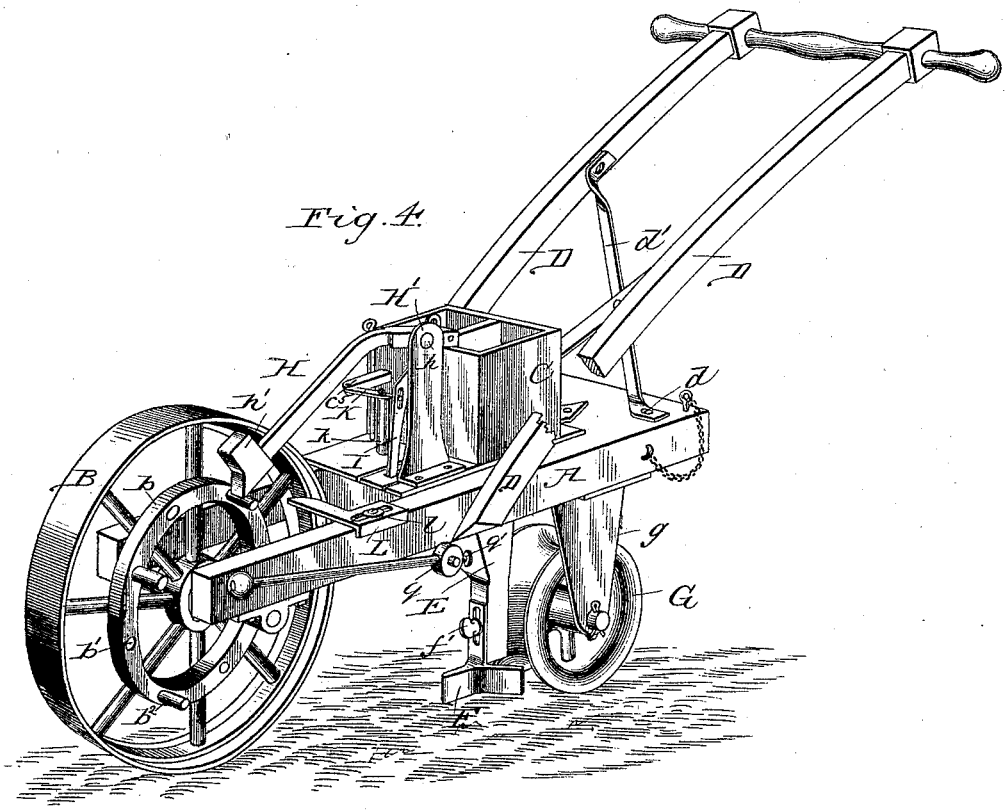
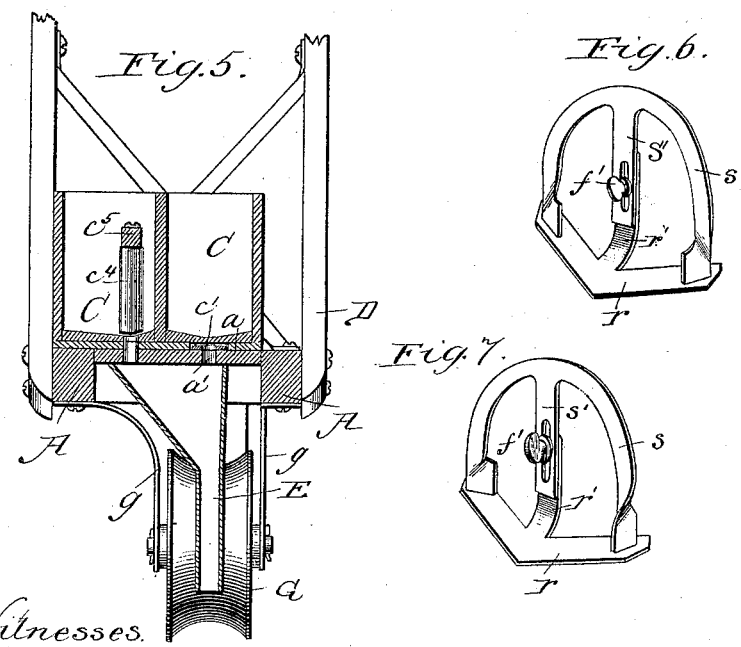
Witnesses.
W. Rossiter
Ernest N. Brown
Inventor.
Charles A. Jones
By Burwisher
Attys.

UNITED STATES PATENT OFFICE.

CHARLES A. JONES, OF CHICAGO, ILLINOIS, ASSIGNOR, BY MESNE ASSIGN-MENTS, OF TWO-THIRDS TO THOMAS F. KEENAN AND P. WILLIAM CROAKE, BOTH OF SAME PLACE.

COMBINED SEEDER, FERTILIZER, AND CULTIVATOR.

SPECIFICATION forming part of Letters Patent No. 342,103, dated May 18, 1886.

Application filed July 25, 1885. Serial No. 172,631. (No model.)

*To all whom it may concern:*

Be it known that I, CHARLES A. JONES, of the city of Chicago, county of Cook, and State of Illinois, have invented certain new and useful Improvements in Combined Seeders, Fertilizers, and Cultivators; and I do hereby declare the following to be a full, clear, and exact description of such improvements sufficient to enable others skilled in the art to make and use the same.

My invention relates to that class of agricultural machines used for seeding and fertilizing; and it consists of certain improvements in the construction thereof, the nature of all of which will more fully appear from the following description, and will thereafter be distinctly pointed out in the claims at the end thereof.

Figure 1:
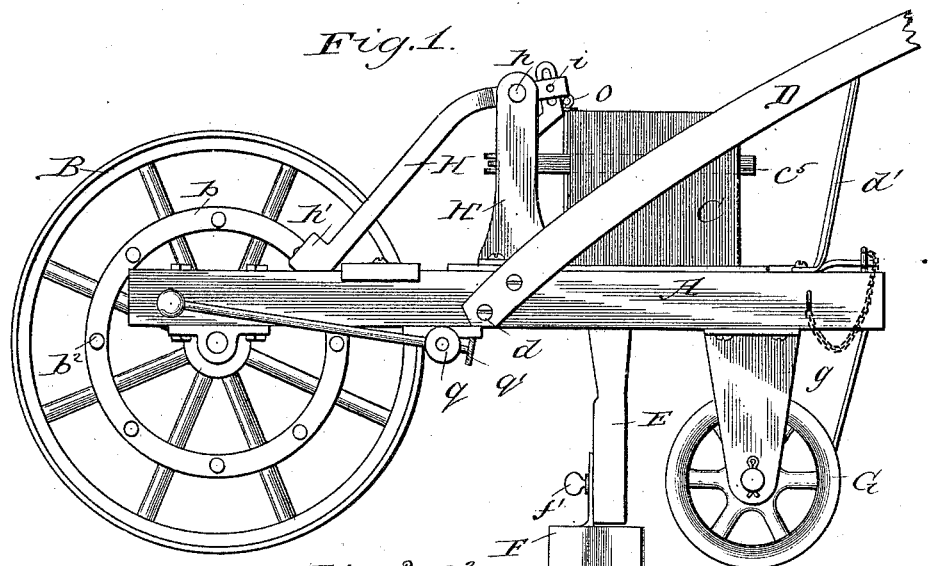
Figure 2:
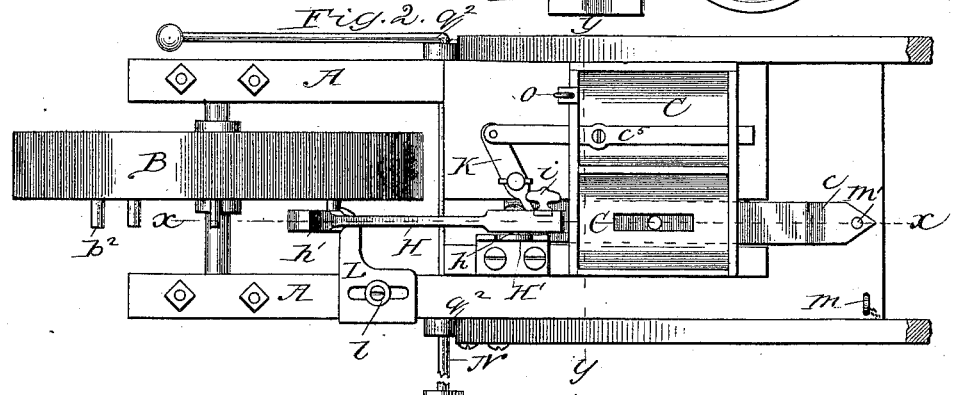
Figure 3:
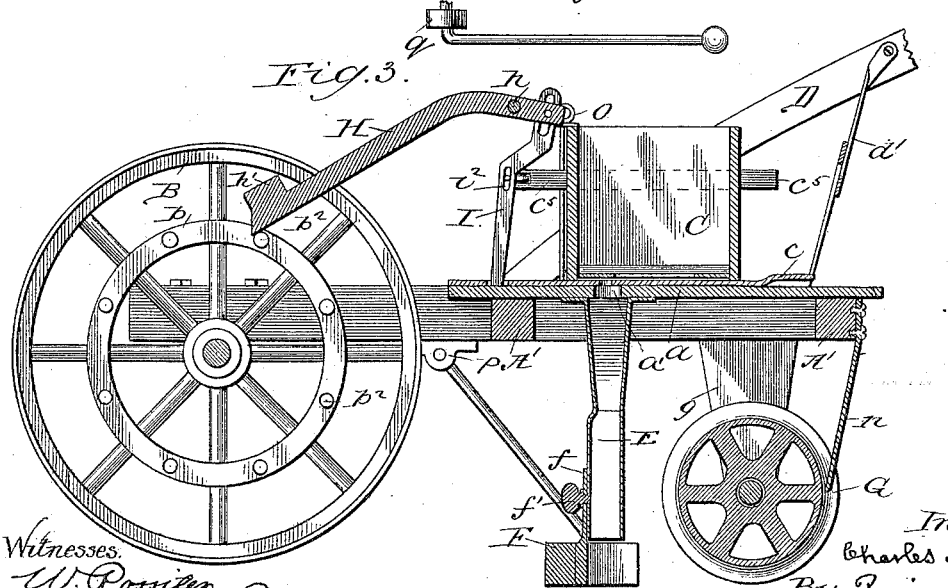

In the accompanying drawings, forming part of this specification, Figure 1 is a view in side elevation, Fig. 2 a view in plan, and Fig. 3 a view in longitudinal cross section on line $x\ x$ of Fig. 2, of the improved machine constituting my invention. Fig. 4 is a perspective view, and Fig. 5 a transverse section on line $v\ v$ of Fig. 2, of such invention. Figs. 6 and 7 are perspective views in detail of the attachments applied to said machine when the same is to be used as a cultivator.

Journaled in bearings between the beams A, and near the forward end thereof, is the main wheel B, of any suitable pattern, and preferably having the ring $b$ secured to its spokes, as shown.

About the circuit of the ring $b$ a series of holes, $b'$, is formed at regular intervals, said holes being designed to receive the ends of the tappet-pins $b^2$, which are screw-threaded or otherwise securely set within the holes.

The number and distance apart of the tappet-pins $b^2$ may obviously be varied at pleasure, the pins not in use being preferably set in any one of a companion series of holes arranged upon the opposite side of the ring $b$. By this expedient the rapidity of feed of the machine may be varied at will, and at the same time the tappet-pins in disuse be kept within convenient reach when again needed.

Securely fastened to the parallel beams A are the stout cross-beams A', the whole constituting a platform upon which can be mounted the base-board $a$, to support the seed-hopper boxes C.

Fastened, as at $d$, to the sides of the main beams A are the usual handles, D, from which, for requisite stiffness of support, may extend the cross-braces $d'$, the same being secured to the base-board, as shown, or other convenient point.

The hopper-boxes C are constructed in the usual manner, that for the seed being provided with the ordinary elongated opening beneath which reciprocates the seed-slide $c$, sustained upon the base-board $a$ and between suitable guides or ways provided therefor. The seed-slide $c$ has the feed-hole $c'$ therein, which registers alternately, as well understood, with the elongated opening in the seed-box, and with the outlet $a'$ in the bottom board, $a$.

Beneath the outlet $a'$, and conveniently secured to the base-board $a$, is the seed-tube E, which has an expanded or hopper-like top portion, as shown, to receive the supply of seed and of fertilizer when this latter is being fed.

Instead of providing the fertilizer-box with a reciprocating slide to regulate the feed therefrom, the same is controlled by an upright cut-off, as at $c^4$, said cut-off being attached to a reciprocating slide-bar, $c^5$, the relation of which to the actuating parts will be presently described.

The openings leading through the bottom of the fertilizer-hopper box and the base-board $a$ into the upper part of the seed-tube are clearly shown in Fig. 5.

To the front face of the seed-tube E is secured the furrow-opener F, the same being provided with a vertical shank, $f$, slotted as shown, to enable the furrow-opener to be adjusted up and down upon the seed-tube E, and retained in place, as desired, by the set-screw $f'$.

Directly back of and in line with the furrow-opener is the wheel-closer G, journaled conveniently in the pendent brackets $g$, secured, as shown, to the under side of the main beams A.

The mechanism for controlling the feed from the seed and fertilizer boxes consists of the stout tappet-lever H, pivotally mounted, as at $h$, upon the vertical post or standard H', and bent, as shown, so that the weighted head $h'$ of said tappet-lever shall extend into the path of the tappet-pins $b^2$, projecting from the main wheel B.

Snugly seated within a gain or recess in tappet-lever H is the upper end of the trip-arm I, slotted as shown, and capable of adjustment within the recess of said lever H, by means of the set-screw $i$, threaded to the lever, and bearing with its face against the trip-arm I. A slot, as at $i^2$, in said trip-arm I serves to admit the end of the rocking-arm K, pivotally mounted, as shown, upon the pedestal or column $k$. The lower end of trip-arm I engages loosely a slot in the forward end of the seed-slide or dropping-bar $c$, so that when the tappet-lever H is caused to rock about its pivot $h$ by contact of the tappet-pins $b^2$ with said tappet-lever, the trip-arm I will reciprocate the seed-slide back and forth, and cause the grain to pass from the seed-box to the seed-tube, as well understood.

When it is desired to change the seed-slide or dropping-bar $c$, so as to adapt the machine for planting various kinds of grain, it is merely necessary to loosen the set-screw $i$, which secures the tappet-lever to the trip-arm, whereupon, the latter being lifted, the seed-slide may be withdrawn from the machine, and another of desired dimensions substituted therefor. The end of the rocking-arm K opposite to that which engages the slot in the trip-arm I is secured by pin-joint to the forward end of the reciprocating slide-bar $c^5$, which carries the fertilizer cut-off $c^4$, as described. The cut-off $c^4$ serves not only to regulate the outflow of the fertilizer, but, by reason of its position, acts also as an agitator to loosen up the fertilizing material, and maintain it in condition for ready discharge.

The arrangement of the parts of the feeding mechanism, as set forth, is such that when both seed and fertilizer are in their respective hopper-boxes, the single movement of the tappet-lever H causes the desired portions of seed and fertilizer to be discharged simultaneously into the seed-tube E, and thence into the open furrow.

The gage-plate L, having a slot therein, as shown, is attached to one of the beams A by means of the set-screw $l$. An arm projecting from this plate into the path of the tappet-lever H serves to arrest the drop of said lever about its pivot $h$, immediately after the tappet-pin has cleared the weighted head $h'$ thereof. If the gage-plate is set well forward upon the beam A, so that its projecting arm arrests the descent of the tappet-lever within a short distance after said lever has cleared the tappet-pin, the throw of the tappet-lever will be short, and the momentum acquired by the seed-slide be comparatively slight. By setting the gage-plate farther back along the beam, the tappet-lever will be allowed to drop farther before contacting with said plate, and in consequence will impart greater momentum to the seed-slide. By this means the action of the seed-slide may be regulated with respect to the resistance of the seed, through which it must force its way.

When it is desired to move the machine along the road or across the field without operating the seeding mechanism, it is merely necessary to thrust the seed-slide $c$ forward in its bearings, so as to raise the weighted end $h'$ of the tappet-lever H above the pivot $h$ and clear from contact with the tappet-pins, in which position of the seed-slide a set-pin, $m$, or like locking device may be inserted through the hole $m'$ in the seed-slide $c$ and into the base-board, thereby maintaining the tappet-lever above the sweep of the tappet-pins and holding the seeding mechanism at rest.

A scraper, $n$, attached to one of the cross-beams of the machine, extends close against the face of the wheel-closer G, and serves to clear the same in the usual manner.

A pin, $o$, may conveniently be mounted upon the side of the hopper-box, and be employed, when desired, to clear the openings leading from the fertilizer-box to the seed-tube.

Resting loosely in the journals $p$, secured beneath the main beams A, is the marking-bar N, which consists, as shown, of the straight portion to rest within the journals and the angularly-bent ends or terminals which sweep along the ground. One of these ends is conveniently formed in piece with the main portion of the bar, while the other is secured to a collar, $q$, which slips over the rod, and is retained in place thereon by the set-screw $q'$. Companion collars or sleeves, $q^2 q^3$, are mounted upon the marking-bar at the opposite side of the machine, as shown. By loosening the set-screws of the gage-collars $q^2 q^3$, the marking-bar may be slid through its bearings upon the machine until the trailing end thereof is at proper distance to indicate the line of the next furrow. The set-screws of the gage-collars being now turned down tight hold the marking-bar against any lateral movement at the same time that said bar is free to turn upon its bearings, thus allowing the trail end to rise clear from any obstruction it may encounter, and then immediately to drop again. When the end of the field is reached, the gage-collars are again loosened, the machine being meanwhile reversed, the marking-bar N thrust through its bearings, bringing the opposite bent arm thereof into play as a trailing end, with the other bent end elevated clear from the field. In such position of the parts the screws of the gage-collars are again set, and the machine is in readiness to proceed.

In employing the machine as a cultivator, it is merely necessary to set the tappet-lever H above and clear from the sweep of the tappet-pins in manner already described, and to remove the furrow-opener F from its place upon the seed-tube E.

In lieu of the furrow-opener the cultivator mechanism proper consists, as shown in Figs. 6 and 7, of a flaring point, r, and a bow-like mold-board, s, having reversely-bent ends which rest at their tips upon the point r. The tongues or shanks $r'$ $s'$, of the point and mould-board, respectively, are slotted, as shown, and bear against each other, and are capable of being secured in position upon the seed-tube E, by means of the set-screw $f'$. As clearly appears from Figs. 6 and 7, the shape of the bent ends of the mold-board s allows the same to be reversed at will in its place upon the seed-tube or like upright standard, thus causing the dirt to be thrown toward the hill, or else, upon reversal, acting to throw the dirt and weeds away.

It is obvious that the details of my machine may be largely varied from what has herein been described without departing from the spirit of my invention, which is not restricted to such precise details. Thus, for example, in lieu of the reciprocating seed-slide, a rotary slide or cup-feed may be employed in combination with the hoppers, the same being actuated by pawl-and-ratchet or like mechanism, operated through and by the tappet-lever.

Having thus described the invention, what I claim as new, and desire to secure by Letters Patent, is—

1. The combination, with the main wheel carrying the tappet-pins thereon, of the tappet-lever projecting into the path of said pins to operate the seeding mechanism and the adjustable gage-plate mounted upon the machine-frames to arrest and regulate the drop of said lever as it is released from the tappet-pins, substantially as described.

2. The combination, with the fertilizer-hopper and its outlet, of the slide-bar $c^3$ and the cut-off $c^4$, said cut-off serving both to stir the fertilizer and to control its outflow, substantially as described.

3. The combination, with the tappet-wheel, of the tappet-lever, the trip arm secured thereto, the rocking arm connected with said trip-arm, and the slides actuated by said arms, respectively, and co-operating with the hopper-boxes to control the feed therefrom, substantially as described.

4. The combination, with the tappet-wheel, of the tappet-lever, the trip-arm secured thereto, the rocking arm connected with said trip-arm, the seed-slide operated by said trip-arm, and the sliding bar provided with the cut-off, said bar being actuated by the rocking arm, substantially as described, whereby the simultaneous discharge from the hopper-boxes is effected, substantially as set forth.

5. The combination, with the tappet-wheel and tappet-lever, of the trip-arm secured thereto, the rocking arm connected with said trip-arm, and mechanism, substantially as described, operated thereby, to regulate the feed from the fertilizer-box, substantially as set forth.

6. The combination, with the tappet-wheel and tappet-lever, of the trip-arm secured thereto, the rocking arm connected with said trip-arm, and the sliding bar provided with the stirrer cut off to control the outlet from the fertilizer-box, substantially as set forth.

7. The combination, with the tappet-lever and with the trip-arm secured thereto, of the seed-slide, the base-board, and the lock-pin co-operating therewith to hold the said slide in fixed position, as described, whereby the drop end of the tappet-lever is sustained clear from the tappet-pins, substantially as set forth.

8. The combination, with the tappet-lever, of the slotted trip-arm adjustably secured thereto and the seed-slide, whereby upon loosening the trip-arm from the tappet-lever the seed-slide may be removed and replaced, substantially as set forth.

9. The combination, with the frame of the seeding-machine, of the free-turning marking-bar mounted thereon, extending across the same, and provided with trailing ends or arms and with means, substantially as described, to hold said bar from lateral play, substantially as set forth.

10. The combination, with the frame of the seeding-machine and with the marking-bar journaled thereon, extending from both sides of the same and provided with trailing ends or arms, of the gage-collars adjustably secured to said bar to control its lateral movement, substantially as set forth.

11. The combination, with the frame of the seeding-machine and with the marking-bar journaled thereon, of the gage-collar $q^2$ $q^3$, and the collar $q$, carrying one of the trail-ends of said marking rod or bar, substantially as set forth.

CHARLES A. JONES.

Witnesses:
GEO. P. FISHER, Jr.,
JAMES H. PEIRCE.